US011028911B2

(12) United States Patent
Hu et al.

(10) Patent No.: US 11,028,911 B2
(45) Date of Patent: Jun. 8, 2021

(54) ACTUATOR AND APPLICATIONS OF SAME

(71) Applicant: ZHEJIANG JIECANG LINEAR MOTION TECHNOLOGY CO., LTD, Zhejiang (CN)

(72) Inventors: Renchang Hu, Zhejiang (CN); Zhanhui Huang, Zhejiang (CN)

(73) Assignee: ZHEJIANG JIECANG LINEAR MOTION TECHNOLOGY CO., LTD, Zhejiang (CN)

( * ) Notice: Subject to any disclaimer, the term of this patent is extended or adjusted under 35 U.S.C. 154(b) by 302 days.

(21) Appl. No.: 16/121,776

(22) Filed: Sep. 5, 2018

(65) Prior Publication Data

US 2019/0003561 A1 Jan. 3, 2019

Related U.S. Application Data

(62) Division of application No. 14/710,392, filed on May 12, 2015, now Pat. No. 10,094,456.

(60) Provisional application No. 61/992,757, filed on May 13, 2014.

(30) Foreign Application Priority Data

May 30, 2014 (CN) .......................... 201410239511.9
May 30, 2014 (CN) .......................... 201420286872.4

(51) Int. Cl.
*F16H 25/20* (2006.01)
*F16H 25/12* (2006.01)
*F16H 57/00* (2012.01)
*F16H 57/023* (2012.01)

(Continued)

(52) U.S. Cl.
CPC ............. *F16H 25/12* (2013.01); *F16H 25/20* (2013.01); *F16H 57/0006* (2013.01); *F16H 57/023* (2013.01); *F16H 57/039* (2013.01); *H02K 7/1166* (2013.01); *F16H 2025/209* (2013.01); *F16H 2025/2031* (2013.01); *F16H 2025/2084* (2013.01); *Y10T 74/18792* (2015.01)

(58) Field of Classification Search
CPC .... F16H 2025/209; F16H 25/12; F16H 25/20; F16H 57/0006; F16H 57/039; F16H 57/023; F16H 2025/2084; Y10T 74/18792
See application file for complete search history.

(56) References Cited

U.S. PATENT DOCUMENTS 2,192,845 A * 3/1940 Bean ....................... A47J 43/06
310/83
4,535,645 A * 8/1985 De Bisschop ......... B62D 1/185
403/109.5

(Continued)

FOREIGN PATENT DOCUMENTS

EP              2375548         *  5/2010

*Primary Examiner* — William Kelleher
*Assistant Examiner* — Gregory T Prather
(74) *Attorney, Agent, or Firm* — Tim Tingkang Xia, Esq.; Locke Lord LLP

(57) ABSTRACT

In one aspect of this invention, an actuator includes a motor having an output worm shaft, a transmission mechanism operatively coupled to the output worm shaft of the motor for converting a rotating motion of the motor into a linear reciprocating motion, a housing and mounting means for mounting the motor in the housing, where the transmission mechanism is devoid of a coil spring, and the mounting means is devoid of a foam plastic block.

10 Claims, 13 Drawing Sheets

(51) Int. Cl.
  *F16H 57/039* (2012.01)
  *H02K 7/116* (2006.01)

(56) References Cited

U.S. PATENT DOCUMENTS

| | | | | |
|---|---|---|---|---|
| 4,541,160 A * | 9/1985 | Roberts | ............ | F16C 1/02 29/401.1 |
| 4,748,865 A * | 6/1988 | Umezawa | ............ | F16D 3/74 464/92 |
| 4,899,608 A * | 2/1990 | Knappe | ............ | F16D 3/78 74/411 |
| 5,178,026 A * | 1/1993 | Matsumoto | ............ | F16D 3/74 464/73 |
| 5,743,670 A * | 4/1998 | Ader | ............ | E04B 1/6137 403/11 |
| 5,823,499 A * | 10/1998 | Ito | ............ | B60N 2/067 248/429 |
| 5,956,998 A * | 9/1999 | Fenelon | ............ | E05B 81/25 292/144 |
| 6,073,504 A * | 6/2000 | Gleixner | ............ | B60J 7/057 192/139 |
| 6,086,232 A * | 7/2000 | Schulze | ............ | B60Q 1/076 362/523 |
| 6,393,929 B1 * | 5/2002 | Quere | ............ | F16H 1/16 74/411 |
| 6,481,306 B2 * | 11/2002 | Adachi | ............ | F16H 1/16 74/411 |
| 6,516,904 B1 * | 2/2003 | Rein, Sr. | ............ | E21B 17/00 175/320 |
| 6,617,726 B1 * | 9/2003 | Tsergas | ............ | F16H 1/203 310/40 R |
| D509,520 S * | 9/2005 | Klinke | ............ | D15/143 |
| 7,159,485 B2 * | 1/2007 | Acosta | ............ | F16H 55/14 464/73 |
| 7,340,974 B2 * | 3/2008 | Landskron | ............ | B60N 2/067 74/425 |
| 7,506,560 B2 * | 3/2009 | Klinke | ............ | A47B 21/06 192/223.4 |
| D624,272 S * | 9/2010 | Gudiksen | ............ | D34/31 |
| 8,429,995 B2 * | 4/2013 | Yamashita | ............ | F16H 55/14 74/409 |
| 8,674,572 B2 * | 3/2014 | Dietrich | ............ | H02K 11/21 310/83 |
| 8,752,488 B2 * | 6/2014 | Moller | ............ | A47B 9/20 108/20 |
| 9,018,813 B2 * | 4/2015 | Randlov | ............ | A47B 9/04 310/89 |
| 9,480,333 B2 * | 11/2016 | Randlov | ............ | F16H 25/2056 |
| 9,541,186 B2 * | 1/2017 | Kanzaki | ............ | F16H 57/023 |
| 10,054,190 B2 * | 8/2018 | Kim | ............ | F16D 3/68 |
| 10,436,242 B2 * | 10/2019 | Hu | ............ | F16C 3/035 |
| 10,816,079 B2 * | 10/2020 | Kannan | ............ | F16C 3/18 |
| 10,914,111 B2 * | 2/2021 | Oster | ............ | F16H 57/021 |
| 2002/0011127 A1 * | 1/2002 | Torii | ............ | F16H 1/16 74/425 |
| 2006/0103975 A1 * | 5/2006 | Tokumiya | ............ | G11B 17/0287 360/99.12 |
| 2006/0279143 A1 * | 12/2006 | Platz | ............ | A47B 9/04 310/51 |
| 2008/0210029 A1 * | 9/2008 | Wang | ............ | F16H 25/20 74/89.38 |
| 2011/0128740 A1 * | 6/2011 | Hartmann, Jr. | ............ | F21V 14/02 362/287 |
| 2013/0345717 A1 * | 12/2013 | Markvicka | ............ | A61B 34/30 606/130 |
| 2014/0259397 A1 * | 9/2014 | McReynolds | ............ | A47C 20/041 5/412 |
| 2016/0031509 A1 * | 2/2016 | Robbins | ............ | B62J 17/02 296/82 |
| 2016/0333540 A1 * | 11/2016 | Kaufman | ............ | E04G 23/065 |
| 2017/0073033 A1 * | 3/2017 | Nabet | ............ | B62K 25/02 |
| 2019/0127940 A1 * | 5/2019 | Kaufman | ............ | E02D 27/12 |

* cited by examiner

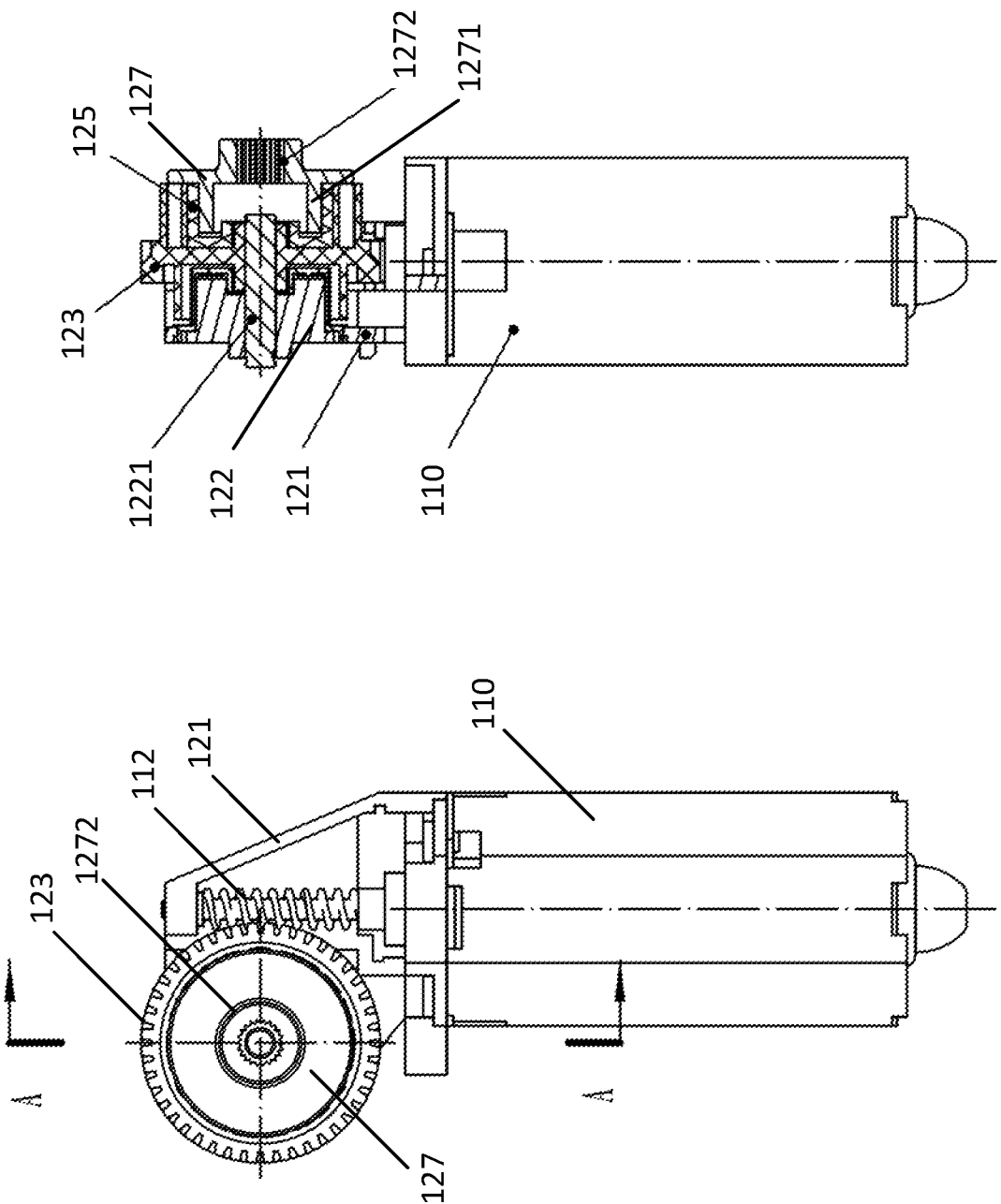

us 11,028,911 B2

ACTUATOR AND APPLICATIONS OF SAME

CROSS-REFERENCE TO RELATED PATENT APPLICATIONS

This application is a divisional patent application of U.S. patent application Ser. No. 14/710,392, filed May 12, 2015, now issued U.S. Pat. No. 10,094,456, which itself claims priority to and the benefit of U.S. provisional patent application No. 61/992,757, filed May 13, 2014, and Chinese patent application Nos. CN201420286872.4 and CN201410239511.9, both filed May 30, 2014 in the State Intellectual Property Office of P.R. China, which are incorporated herein in their entireties by reference.

FIELD OF THE INVENTION

This invention relates generally to driving devices, and more particularly to actuators for converting a rotating motion into a linear reciprocating motion and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Driving of an instrument or furniture such as, for example, an office desk, a table, a bed, a chair or the like often requires an actuator that is configured to convert a rotary motion into a reciprocating linear motion, so as to cause movements of an adjustable element in a structure in which the actuator is incorporated. For such an actuator, a reversible electric motor is utilized to generate the rotary motion and a transmission member is coupled to the electric motor so as to convert the rotary motion of the electric motor into the reciprocating linear motion of the actuator. Typically, a coil spring is employed in the transmission member to exert a braking force when the electric motor is deactivated. However, when the coil spring exerts the braking force, which is caused by friction, undesirable heat may be generated, which may not only have adverse consequences for the braking effect, but may also damage its surrounding structure. Further, such an actuator is structurally and operably very complicated, and costly in fabrication.

In addition, the electric motor is usually secured in a cabinet of the actuator by a foam plastic block filling an interior of the cabinet entirely, where the foam plastic block defines a recess therein, and the electric motor is tightly received in the recess of the foam plastic block, i.e., the foam plastic block entirely covers the electric motor sides. When the electric motor operates, its rotor is rotating back and forth rapidly, thereby generating heat therein. The use of the foam plastic block may degrade the heat dissipation performance of the actuator. On the other hand, when heated, the foam plastic block is easy to be distorted, easy aging or even to be melt, which may make the recess no longer match the electric motor tightly, thereby causing vibrations of the electric motor, and in turn, affecting the performance of the actuator.

Therefore, a heretofore unaddressed need exists in the art to address the aforementioned deficiencies and inadequacies.

SUMMARY OF THE INVENTION

In one aspect, the invention relates to an actuator for converting a rotating motion into a linear reciprocating motion. In one embodiment, the actuator includes a motor having a front end and an output worm shaft extending from the front end.

The actuator also includes a transmission mechanism that comprises a bracket mounted onto the front end of the motor, having a base, and a fixing pin extending from the base along a direction perpendicularly to the worm shaft of the motor; a worm wheel having a first side, an opposite, second side, and a polygon-shaped recess defined in the second side, the worm wheel attached onto the base through the fixing pin on the first side, and meshing with the worm shaft of the motor; and a connector having a first end portion and a second end portion extending oppositely from the first end portion, the first end portion formed in a polygon shape substantially complemental to that of the polygon-shaped recess such that the first end portion is tightly received in the polygon-shaped recess.

Further, the actuator also includes an adjustable member operatively connected to the second end portion of the connector of the transmission mechanism, such that when the motor rotates in one direction, the adjustable member is in an extending movement, and when the motor rotates in the other direction, the adjustable member is in a retracting movement.

In one embodiment, the transmission mechanism further comprises a cushion member placed between walls of the polygon-shaped recess of the worm wheel and the first end portion of the connector.

In one embodiment, the transmission mechanism is devoid of a coil spring.

In one embodiment, the actuator further comprises a housing and mounting means for mounting the motor in the housing, where the housing has side walls and a bottom wall defining an opening therewith, and a cover adapted to cover the opening, and the mounting means is devoid of a foam plastic block.

In one embodiment, the mounting means comprises two or more support posts formed on the cover of the housing to define a space therebetween, and two or more sleeve members attached to the respective support posts, such that, as assembled, the motor is tightly positioned in the space, where the two or more cover sleeve members are formed of an elastic material.

In another embodiment, the mounting means comprises two or more support posts' formed on the bottom wall of the housing to define a space therebetween, and two or more sleeve members attached to the respective support posts', such that, as assembled, the motor is tightly positioned in the space, where the two or more cover sleeve members are formed of an elastic material.

In yet another embodiment, the mounting means comprises at least one Ω-shaped clamp and two or more screws to securely mount the motor on the bottom wall of the housing, such that, as assembled, the motor is tightly positioned between the Ω-shaped clamp and the bottom wall of the housing. In one embodiment, the mounting means further comprises one or more cushions placed between the Ω-shaped clamp and the motor, where the one or more cushions are formed of an elastic material.

In one embodiment, the actuator further includes an elastic pad placed between the motor and the bottom wall of the housing.

In another aspect, the invention relates to an actuator for converting a rotating motion into a linear reciprocating motion. In one embodiment, the actuator includes a motor having a front end and an output worm shaft extending from the front end; a transmission mechanism operatively coupled to the output worm shaft of the motor for converting a rotating motion of the motor into a linear reciprocating motion, where the transmission mechanism is devoid of a coil spring; and a housing and mounting means for mounting the motor in the housing, where the mounting means is devoid of a foam plastic block.

In one embodiment, the transmission mechanism comprises a bracket mounted onto the front end of the motor, having a base, and a fixing pin extending from the base along a direction perpendicularly to the worm shaft of the motor; a worm wheel having a first side, an opposite, second side, and a polygon-shaped recess defined in the second side, the worm wheel attached onto the base through the fixing pin on the first side, and meshing with the worm shaft of the motor; a connector having a first end portion and a second end portion extending oppositely from the first end portion, the first end portion formed in a polygon shape substantially complemental to that of the polygon-shaped recess such that the first end portion is tightly received in the polygon-shaped recess; and a cushion member placed between walls of the polygon-shaped recess of the worm wheel and the first end portion of the connector.

In another embodiment, the transmission mechanism comprises a bracket mounted onto the front end of the motor, having a base, and a fixing pin extending from the base along a direction perpendicularly to the worm shaft of the motor; a worm wheel having a first side, an opposite, second side, a recess defined in the second side, and limiting structures spaced-apart formed on walls of the recess, the worm wheel attached onto the base through the fixing pin on the first side, and meshing with the worm shaft of the motor; a gasket' having flanges radially protruded from a perimeter of the gasket, placed in the recess of the worm wheel such that each limiting structure is tightly positioned between two adjacent flanges; and a connector having a first end portion and a second end portion extending oppositely from the first end portion, the first end portion formed with engaging posts, placed in the recess of the worm wheel such that each engaging post is tightly positioned between two adjacent flanges and between two adjacent limiting structures, whereby each flange of the gasket is tightly positioned between a respective limiting structure and a respective engaging post.

In one embodiment, the housing has side walls and a bottom wall defining an opening therewith, and a cover adapted to cover the opening.

In one embodiment, the mounting means comprises two or more support posts formed on the cover of the housing to define a space therebetween, and two or more sleeve members attached to the respective support posts, such that, as assembled, the motor is tightly positioned in the space, where the two or more cover sleeve members are formed of an elastic material.

In another embodiment, the mounting means comprises two or more support posts' formed on the bottom wall of the housing to define a space therebetween, and two or more sleeve members attached to the respective support posts', such that, as assembled, the motor is tightly positioned in the space, where the two or more cover sleeve members are formed of an elastic material.

In yet another embodiment, the mounting means comprises at least one Ω-shaped clamp and two or more screws to securely mount the motor on the bottom wall of the housing, such that, as assembled, the motor is tightly positioned between the Ω-shaped clamp and the bottom wall of the housing. In one embodiment, the mounting means further comprises one or more cushions placed between the Ω-shaped clamp and the motor, where the one or more cushions are formed of an elastic material.

In certain embodiments, the mounting means may include other types of the mounting means, such us, springs placed between the side walls of the housing and the motor to secure the motor in the housing, and screws to mount the motor to the bottom (or top), or the side walls of the housing, etc.

In one embodiment, the actuator further has an elastic pad placed between the motor and the bottom wall of the housing.

In one embodiment, the actuator further also has a gasket member placed between the motor and the cover.

In one embodiment, the actuator further has an adjustable member operatively connected to the second end portion of the connector of the transmission mechanism, such that when the motor rotates in one direction, the adjustable member is in an extending movement, and when the motor rotates in the other direction, the adjustable member is in a retracting movement.

According to the invention, the motor is mounted in the housing by the mounting means, and there is devoid of a foam plastic block.

In certain embodiments, the actuator is utilized in power lifting columns that can be used in many applications, such as in adjustments of office desks, furniture and others.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein:

FIGS. 3A-3D show partially exploded and cross-sectional views of an actuator according to one embodiment of the invention.

DETAILED DESCRIPTION OF THE INVENTION

Figure 1:
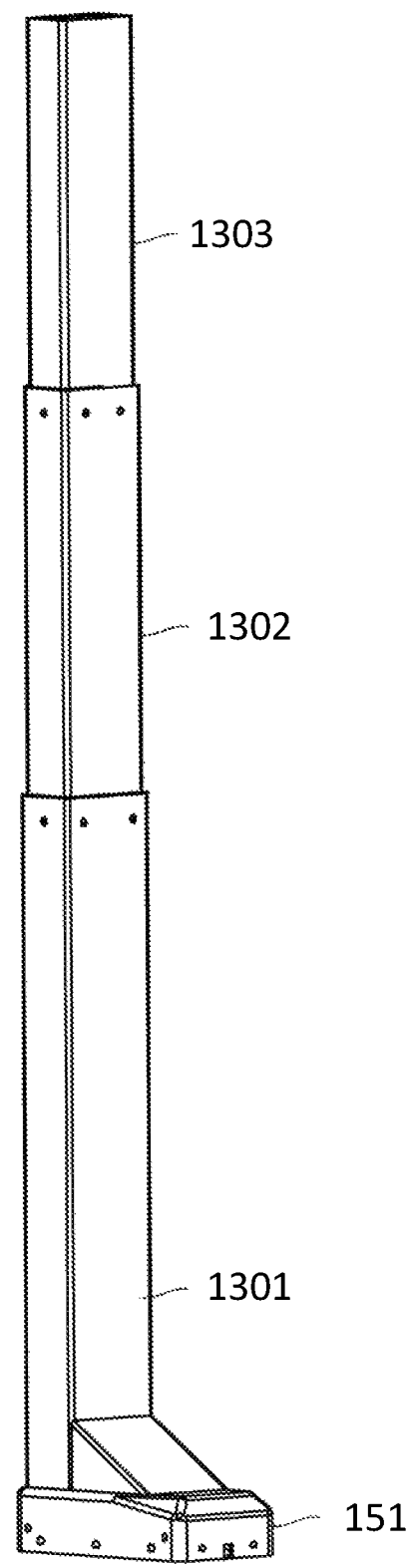
FIG. 1 shows a power lifting column having an actuator according to one embodiment of the invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in one aspect, relates to an actuator for converting a rotating motion into a linear reciprocating motion and applications of the same.

FIG. 1 shows a power lifting column that utilizes the invented actuator to convert a rotating motion into a linear reciprocating motion. The power lifting column includes an outer tube 1301, a middle tube 1:302 and an inner tube 1303 telescopically connected to one another, and a housing 151. The invented actuator, as described below, is positioned inside the tubes 1301-1303 and the housing 151 to drive the tubes 1301-1303 to be extended or retracted so as to lift or lower an instrument, furniture or an object in which the lifting column is incorporated. In one embodiment, one end of the outer tube 1301 is attached to, preferably welded to the housing 151, as shown in FIG. 1. In another embodiment, one end of the inner tube 1303 is attached to, preferably welded to the housing 151 (not shown). The power lifting columns can be used in many applications, such as in adjustments of office desks, furniture and others.

Referring to FIGS. 2A-4D, the actuator 100 is shown according to one embodiment of the invention. In this exemplary embodiment, the actuator 100 includes a motor 110, a transmission mechanism 120 operatively coupled to the motor 110, and a housing 151 and mounting means for mounting the motor 110 in the housing 150, and an adjustable member 130 operatively connected to the transmission mechanism 120, such that when the motor 110 rotates in one direction, the adjustable member 130 is in an extending movement, and when the motor 110 rotates in the other direction, the adjustable member 130 is in a retracting movement.

The motor 110 is a reversible electric motor having a front end and an output worm shaft 112 extending from the front end.

The transmission mechanism 120 has a bracket 121 mounted onto the front end of the motor 110. The bracket 121 has a base 122, and a fixing pin 1221 extending from the base 122 along a direction perpendicularly to the worm shaft 112 of the motor 110. The transmission mechanism 120 also has a worm wheel 123. The worm wheel 123 has a first side 1231, an opposite, second side 1232, and a polygon-shaped recess 124 defined in the second side 1232. The worm wheel 123 is attached onto the base 122 of the bracket 121 through the fixing pin 1221 at the first side 1231, and is mechanically meshing with the worm shaft 112 of the motor 110. The transmission mechanism 120 further has a connector 127 having a first end portion 1271 and a second end portion 1272 extending oppositely from the first end portion 1271. The first end portion 1271 is formed in a polygon shape substantially complemental to that of the polygon-shaped recess 124 such that, as assembled, the first end portion 1271 is tightly received in the polygon-shaped recess 124. In addition, the transmission mechanism 120 also has a cushion member 125 placed between walls of the polygon-shaped recess 124 of the worm wheel 123 and the first end portion 1271 of the connector 127. In certain embodiments, the cushion member 125 is formed of an elastic material such as rubber.

Figure 2A:
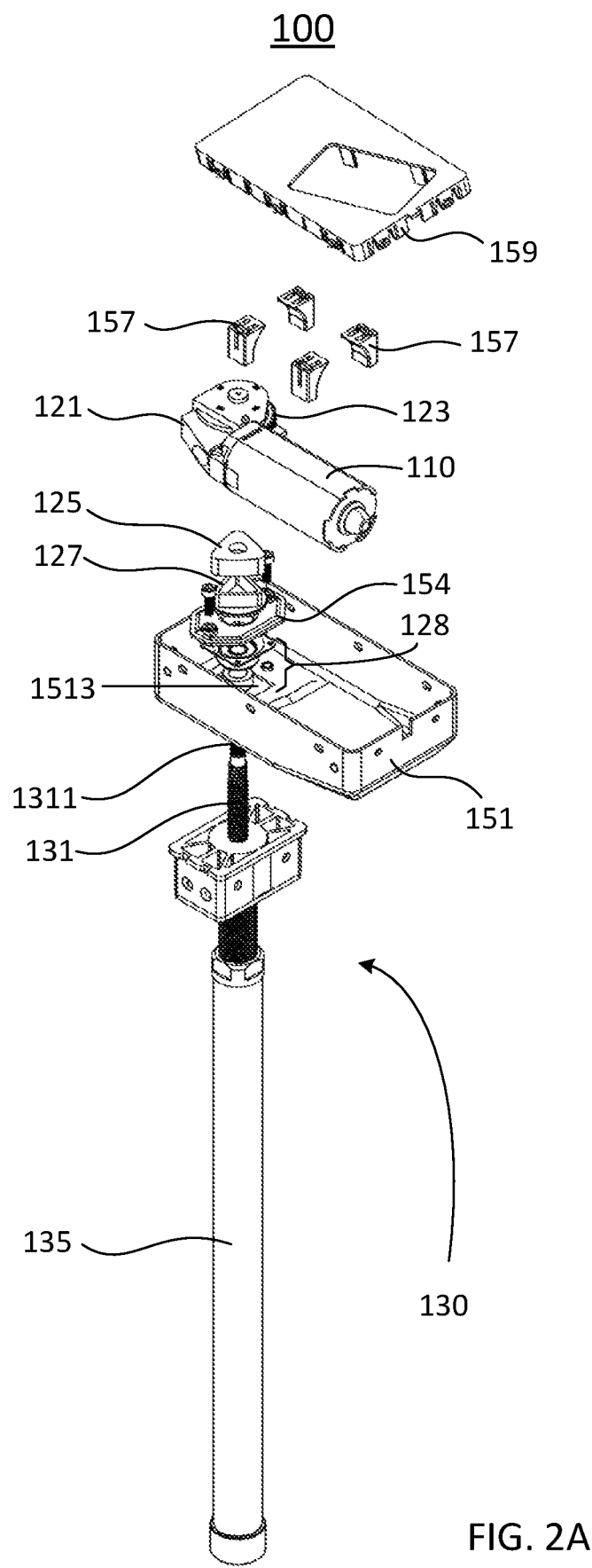
FIG. 2A shows an exploded view of an actuator according to one embodiment of the invention.
Figure 2B:
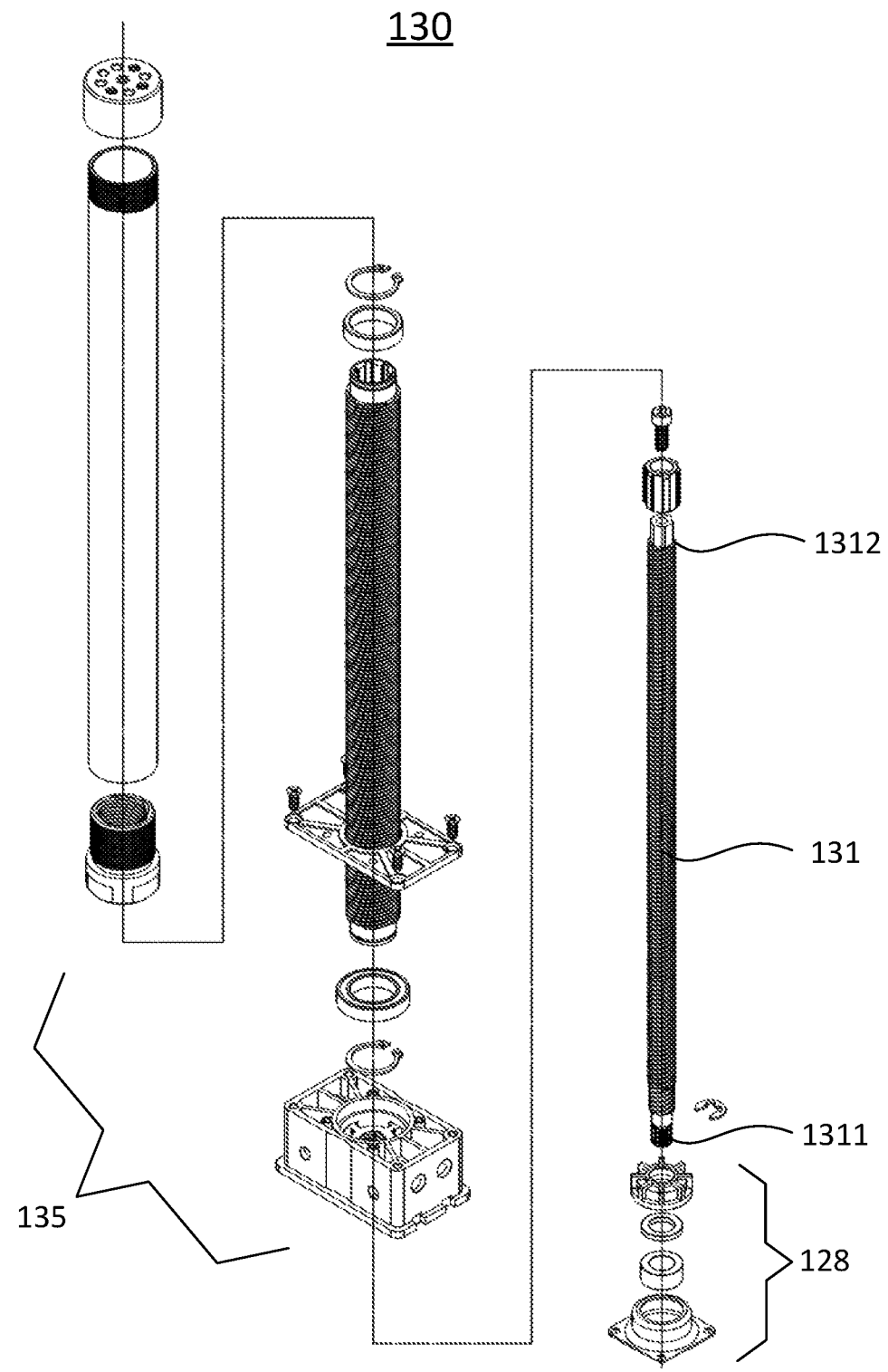
FIG. 2B shows a partially exploded view of an actuator according to one embodiment of the invention.
Figure 3B:
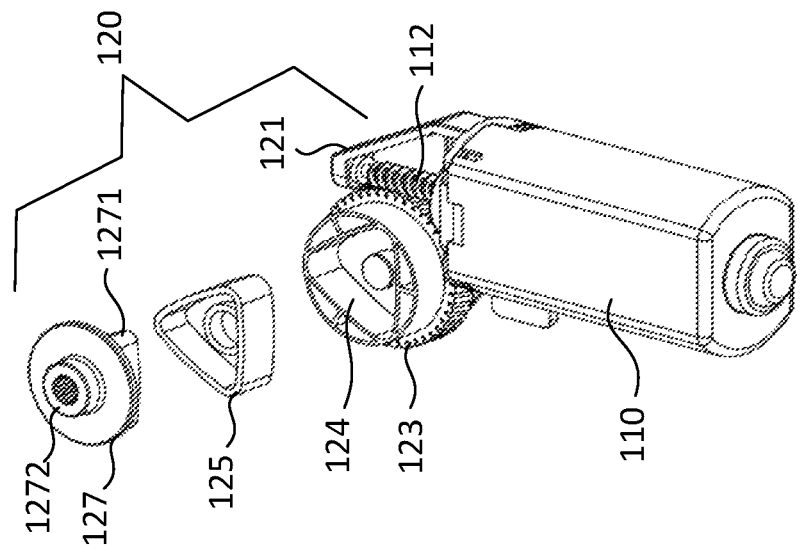
Figure 3A:
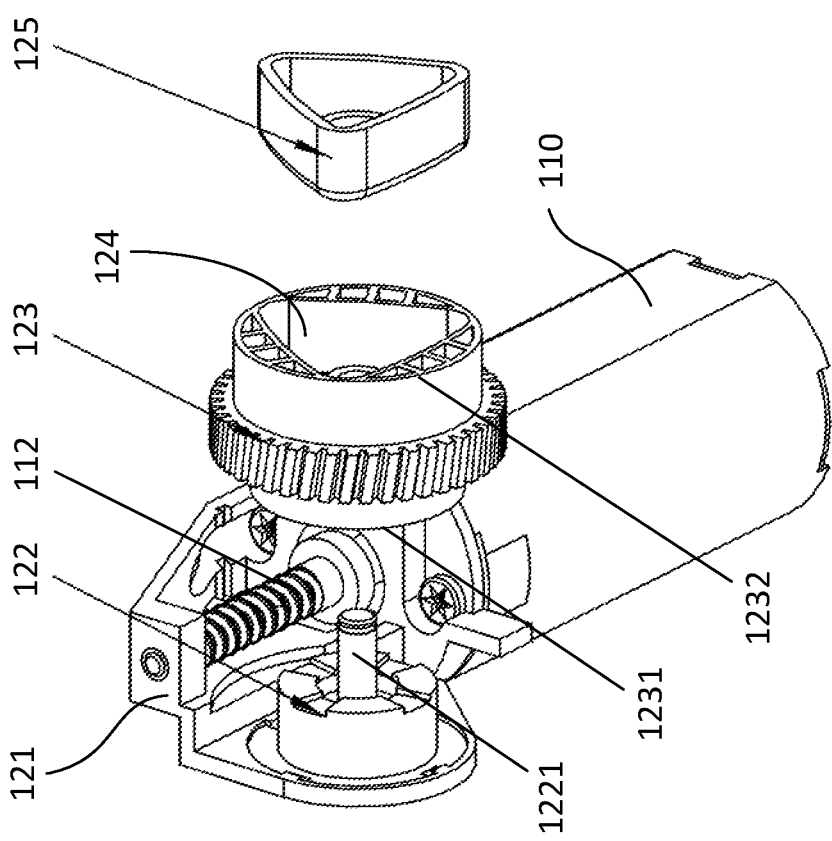

According to the embodiment of the invention, as shown in FIGS. 2A and 3B, the transmission mechanism 120 is devoid of a coil spring.

The housing 151 has side walls 1511 and a bottom wall 1512 defining an opening 152 therewith, and a cover 159 adapted to cover the opening 152. In addition, the bottom wall 1512 has a window 1513 and also a plurality of holes 1514 defined on the side walls 1512.

In one embodiment, as shown in FIGS. 2A and 4A-4D, the mounting means comprises four support posts 158 formed on the cover 159 of the housing 151 to define a space therebetween, and four sleeve members 157 attached to the respective support posts 158. In one embodiment, the four support posts 158 and the cover 159 are integrally formed of a rigid material such as plastic or metal. In certain embodiments, the four sleeve members 157 are formed of an elastic material. As assembled, the motor 110 is tightly positioned in the space.

Figure 5A:
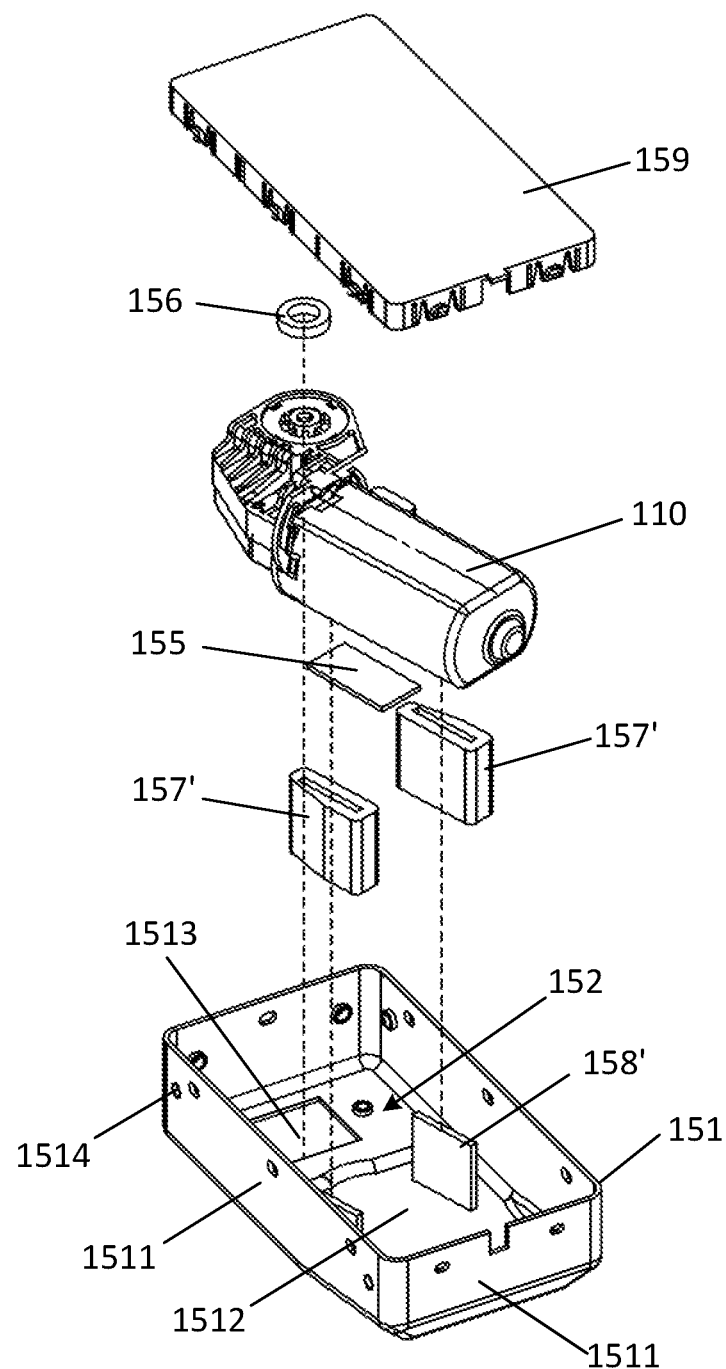
FIGS. 5A-5C show partially exploded and cross-sectional views of an actuator according to one embodiment of the invention.
Figure 5C:
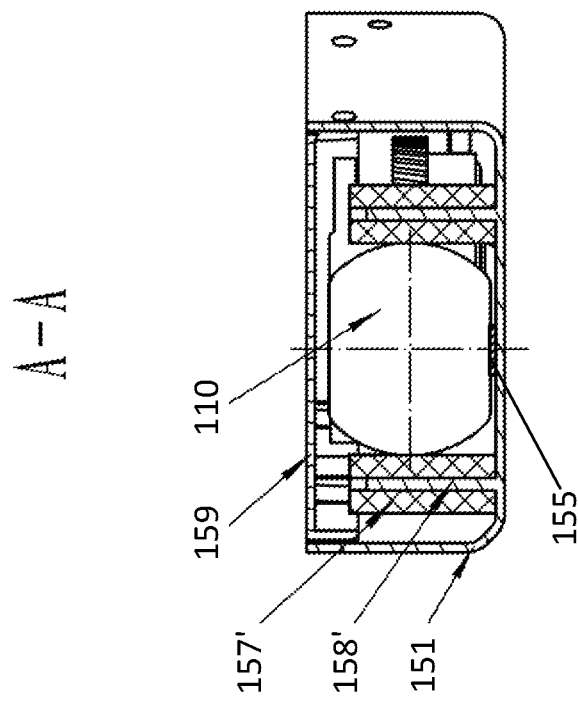
Figure 5B:
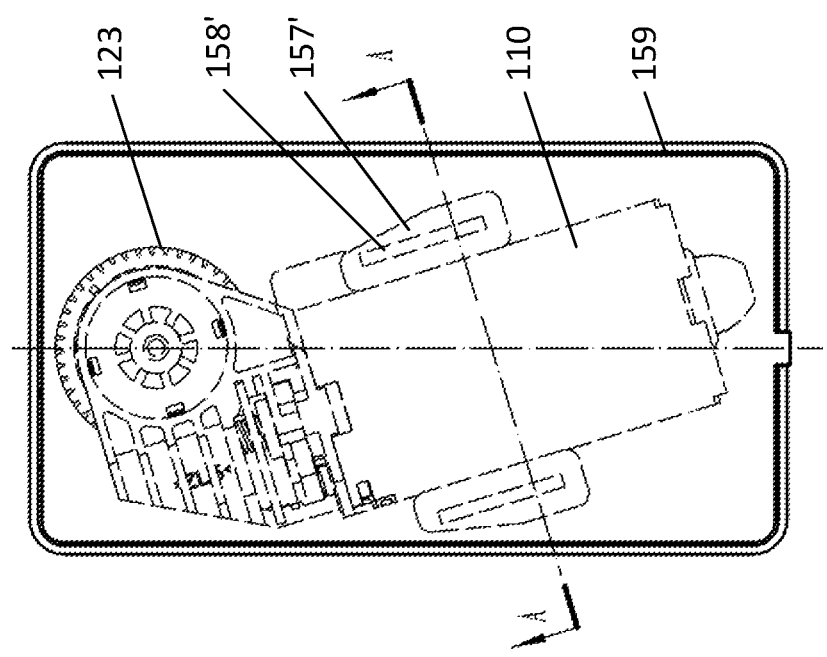

In another embodiment, as shown in FIGS. 5A-5C, the mounting means comprises two support posts 158' formed on the bottom wall 1512 of the housing 151 to define a space therebetween, and two sleeve members 157' attached to the respective support posts 158'. In one embodiment, the two support posts 158' and the bottom wall 1512 are integrally formed of a metal. In another embodiment, the support posts 158' are welded onto the bottom wall 1512 of the housing 151. In certain embodiments, the two or more sleeve members 157' are formed of an elastic material. As assembled, the motor 110 is tightly positioned in the space.

Figure 6A:
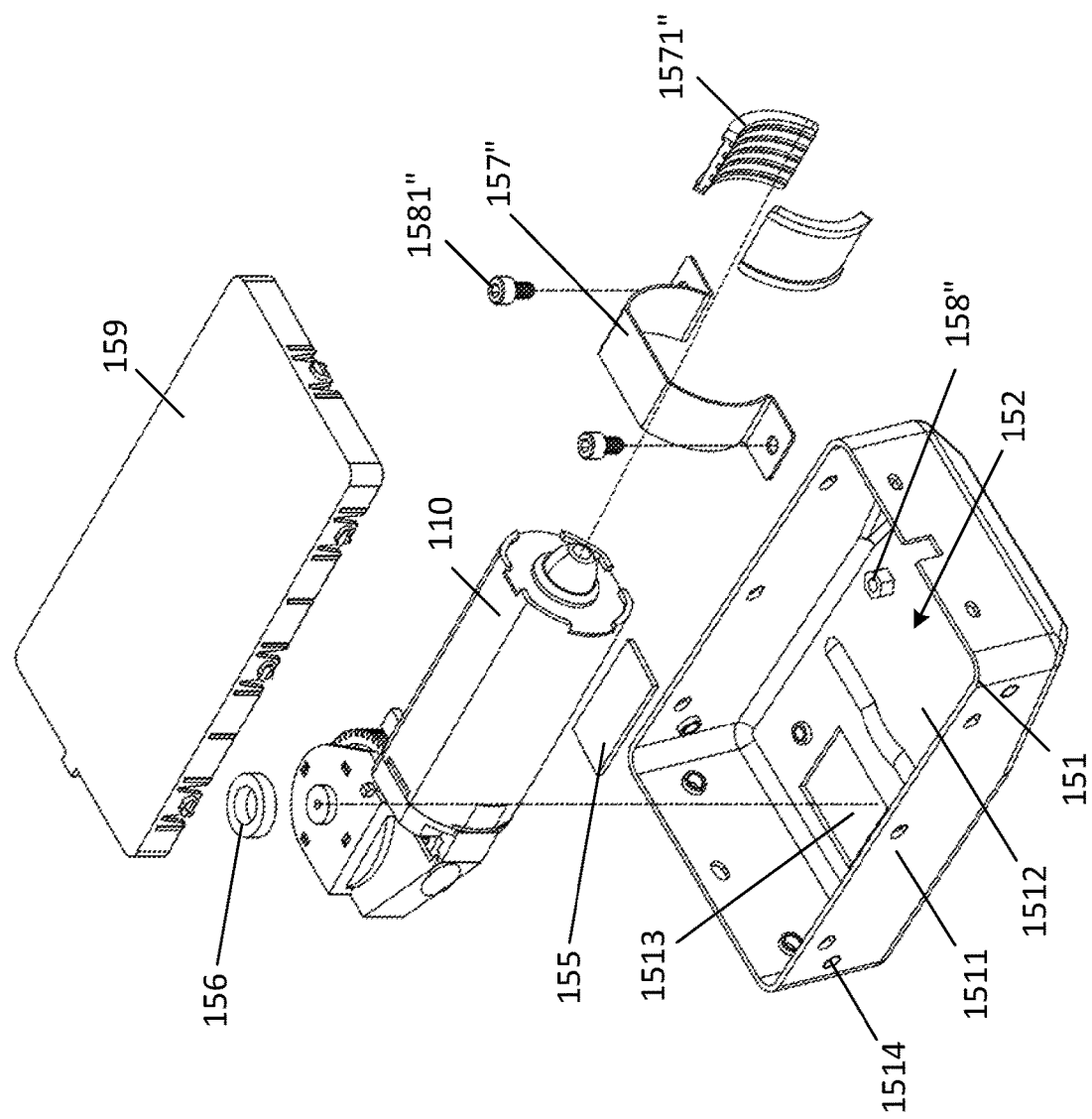
FIGS. 6A-6C show partially exploded and cross-sectional views of an actuator according to one embodiment of the invention.
Figure 6C:
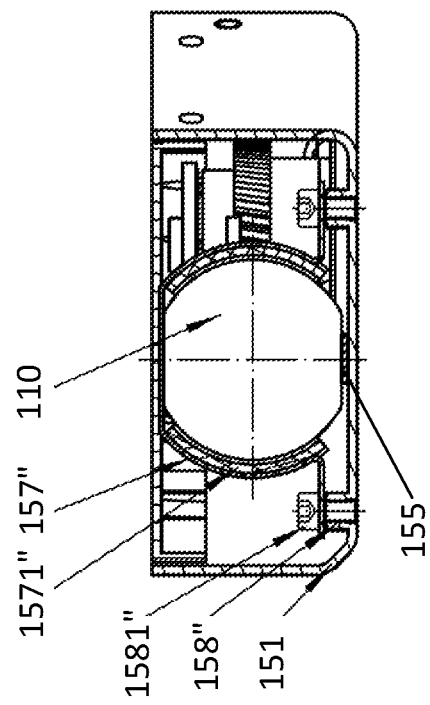
Figure 6B:
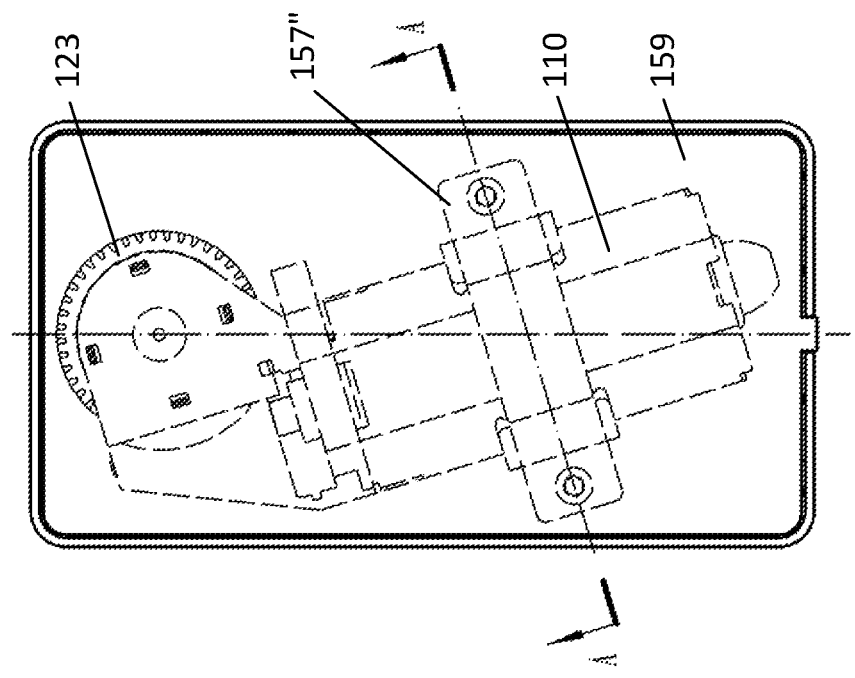

In yet another embodiment, as shown in FIGS. 6A-6C, the mounting means comprises one Ω-shaped clamp 157" and two screws 1581" to securely mount the motor 110 on nuts 158" on the bottom wall 1512 of the housing 151. The Ω-shaped clamp 157" is formed of a rigid material such as plastic or metal. As assembled, the motor 110 is tightly positioned between the Ω-shaped clamp 157" and the bottom wall 1512 of the housing 151. In addition, in order to reduce vibrations and noises, one or more elastic cushions 1571" placed between the Ω-shaped clamp 157" and the motor 110.

In addition, in certain embodiments, as shown in FIGS. 5A and 6A, an elastic pad 155 is placed between the motor 110 and the bottom wall 1512 of the housing 151 for reducing the noises that may be generated due to the metal contact of the motor 110 with the bottom wall 1512 of the housing 151. Further, a gasket member 156 may be placed between the motor 110 and the cover 159. In certain embodiments, the gasket member 156 is placed between the bracket 121 mounted on the front end of the motor 110 and the cover 159. More preferably, the gasket member 156 is placed between the opposite side of the base 122 of the bracket 121 mounted on the front end of the motor 110 and the cover 159.

Figure 4B:
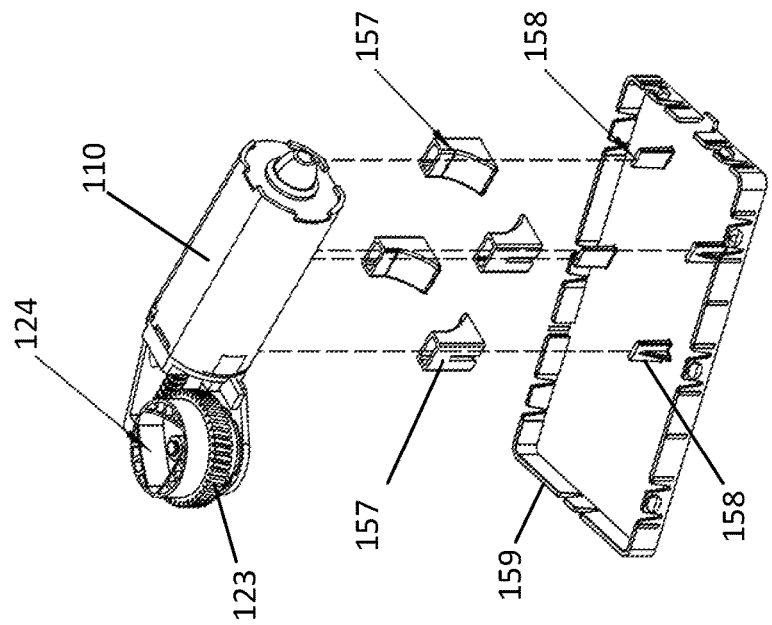
FIGS. 4A-4D show partially exploded and cross-sectional views of an actuator according to one embodiment of the invention.
Figure 4A:
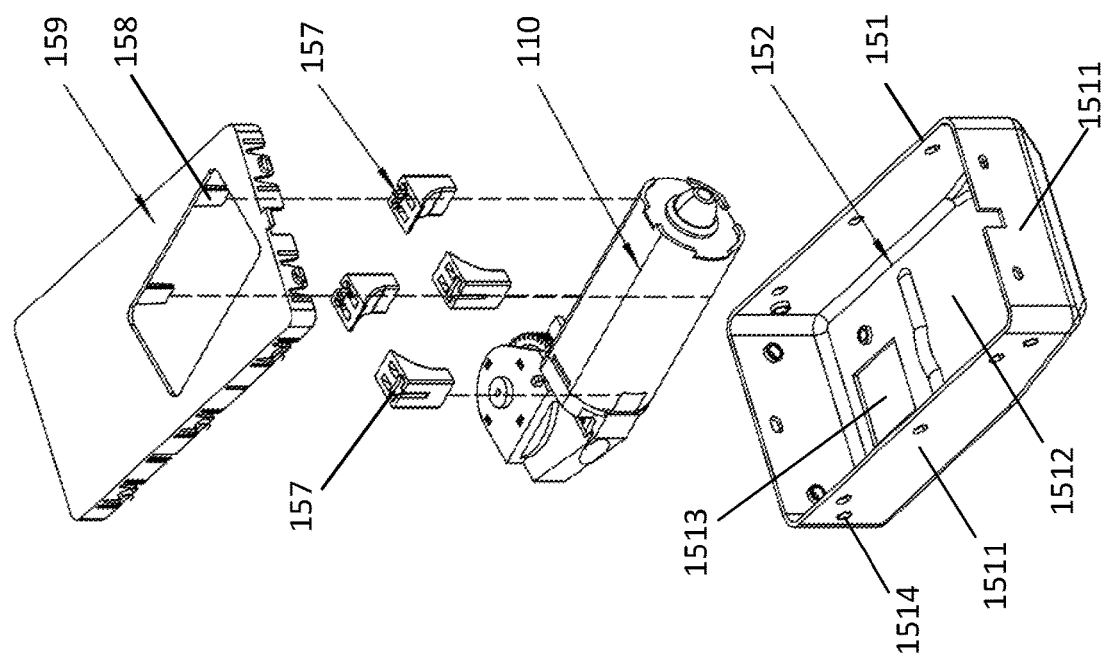
Figure 4D:
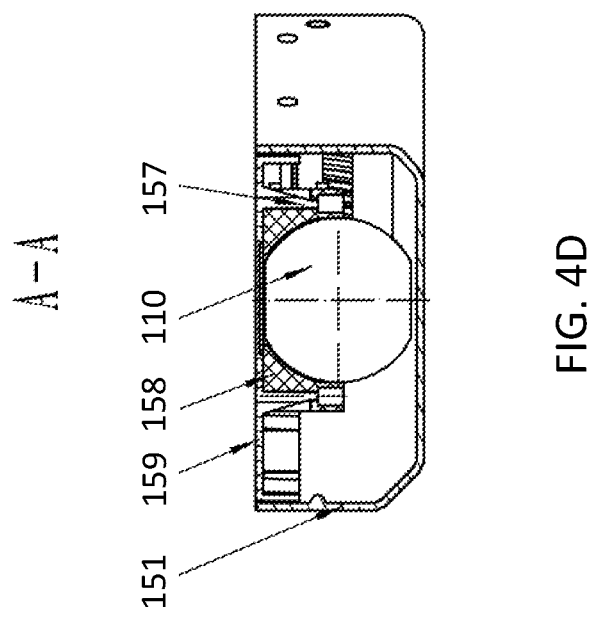
Figure 4C:
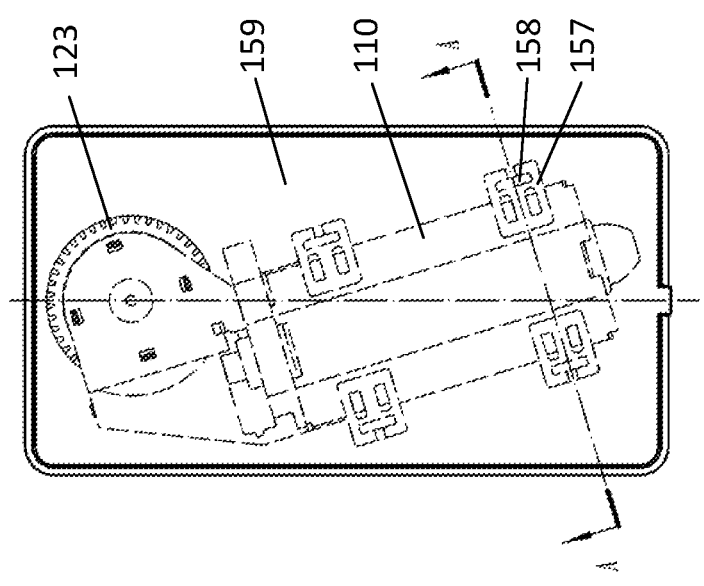

According to the embodiments of the invention, as shown in FIGS. 4A, 5A and 6A, the motor 110 is securely mounted in the housing 151 without a foam plastic block.

Referring back to FIGS. 2A and 2B, the adjustable member 130 has a spindle 131 having one end 1331 passing through the window 1513 of the housing 151 and connected to the second end portion 1272 of the connector 127 of the transmission mechanism 120 through coupling members 128, which in turn, is mounted on the bottom wall 1512 of the housing 151 with a plate 154. The other end 1332 of the spindle 131 is engaged with an activation element 135.

As assembled, the actuator 100 is positioned inside the tubes 1301-1303 and the housing 151 of a lifting column, as shown in FIG. 1. In operation, the motor rotates in one direction, the rotation of the output worm shaft 112 drives the worm wheel 123 to rotate, which in turn, drives the spindle 131 to rotate accordingly, thereby causing the activation element 135 to extend, which drives the tubes 1301-1303 in a extending movement so as to lift an instrument, furniture or an object in which the lifting column is incorporated. Otherwise, when the motor rotates in the other direction, it drives the worm wheel 123 to rotate reversely, which in turn, drives the spindle 131 to rotate reversely, thereby causing the activation element 135 to retract, which drives the tubes 1301-1303 in a retracting movement so as to lower the instrument, furniture or the object in which the lifting column is incorporated.

Figure 7:
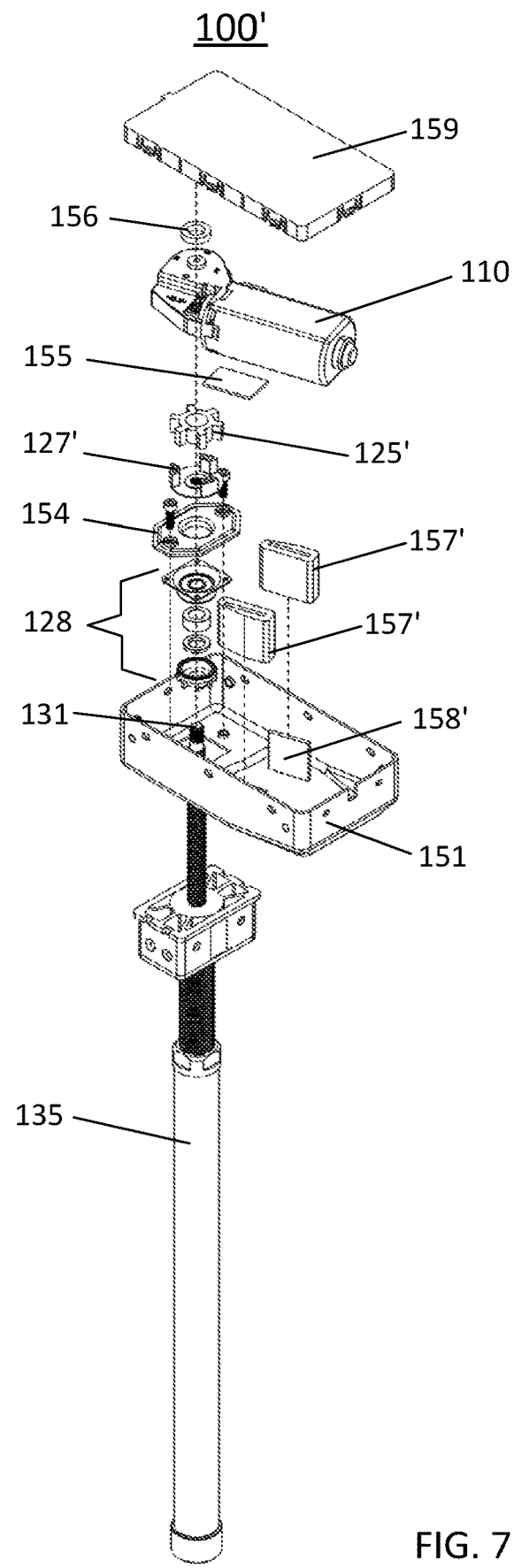
FIG. 7 shows an exploded view of an actuator according to one embodiment of the invention.
Figure 8B:
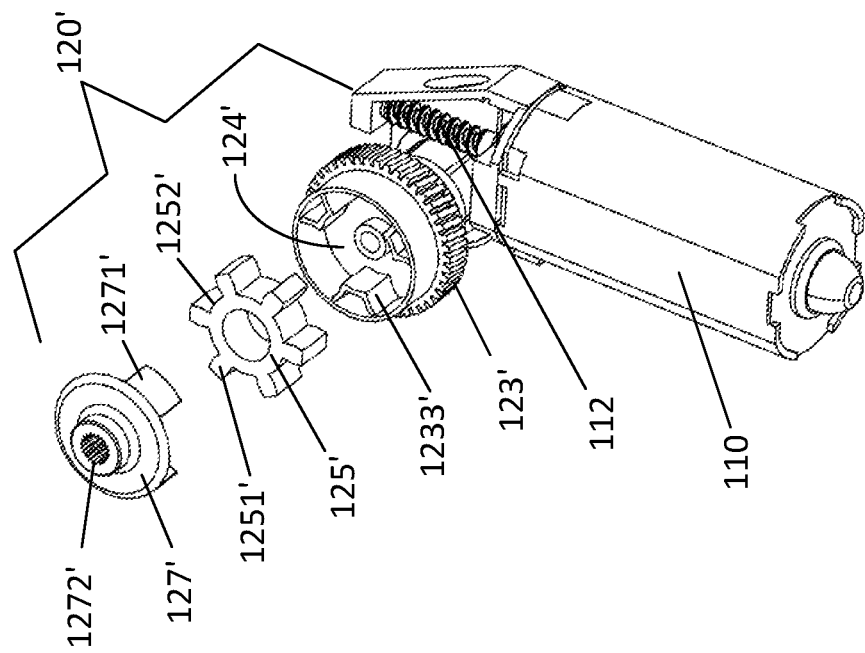
FIGS. 8A and 8B show partially exploded views of an actuator according to one embodiment of the invention.
Figure 8A:
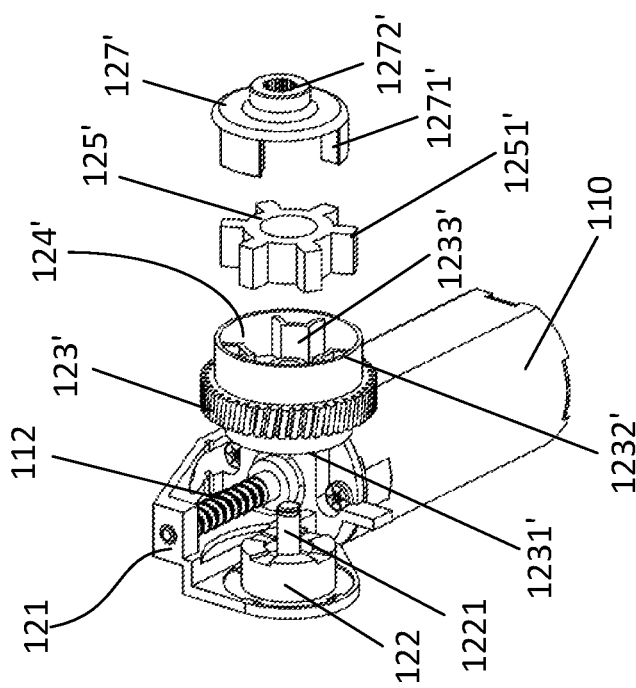

Referring to FIGS. 7, 8A and 8B, the actuator 100' is shown according to another embodiment of the invention. In this embodiment, the actuator 100' is structurally similar to the actuator 100 as shown in FIG. 2A, except that the mounting means is in accordance with that shown in FIGS. 5A-5C, and the transmission mechanism 120' is shown in FIGS. 8A and 8B.

As shown in FIGS. 8A and 8B, the transmission mechanism 120' includes a bracket 121 mounted onto the front end of the motor 110. The bracket 121 has a base 122, and a fixing pin 1221 extending from the base 122 along a direction perpendicularly to the worm shaft 112 of the motor 110.

The transmission mechanism 120' also includes a worm wheel 123' having a first side 1231', an opposite, second side 1232', a recess 124' defined in the second side 1232', and limiting structures 1223' spaced-apart formed on walls of the recess 124'. The worm wheel 123' is attached onto the base 122 through the fixing pin 1221 on the first side 1231', and is mechanically meshing with the worm shaft 112 of the motor 110.

The transmission mechanism 120' further includes a gasket 125' having flanges 1251' radially protruded from a perimeter 1252' of the gasket 125, placed in the recess 124' of the worm wheel 123' such that each limiting structure 1223' is tightly positioned between two adjacent flanges 1251'.

In addition, the transmission mechanism 120' includes a connector 127' having a first end portion 1271' and a second end portion 1272' extending oppositely from the first end portion 1271'. The first end portion 1271' is formed with engaging posts 1271', and placed in the recess 124' of the worm wheel 123' such that each engaging post 1271' is tightly positioned between two adjacent flanges 1251' and between two adjacent limiting structures 1223'. As such, each flange 1251' of the gasket 125 is tightly positioned between a respective limiting structure 1223' and a respective engaging post 1271'.

In addition to the above description, it should be appreciated that other embodiments of the mounting means, such as those shown in FIGS. 4A-4D and 6A-6C, can also utilized in the actuator 100'.

Furthermore, other types of the mounting means, such us, springs placed between the side walls of the housing and the motor to secure the motor in the housing, and screws to mount the motor to the bottom (or top), or the side walls of the housing, etc., can also be utilized in the invention.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An actuator for converting a rotating motion into a linear reciprocating motion, comprising:
    (a) a motor having a front end and an output worm shaft extending from the front end;
    (b) a transmission mechanism operatively coupled to the output worm shaft of the motor for converting a rotating motion of the motor into a linear reciprocating motion, wherein the transmission mechanism is devoid of a coil spring; and
    (c) a housing and mounting means for mounting the motor in the housing, wherein the mounting means is devoid of a foam plastic block,
    wherein the transmission mechanism comprises:
        a bracket mounted onto the front end of the motor, having a base, and a fixing pin extending from the base along a direction perpendicularly to the worm shaft of the motor;
        a worm wheel having a first side, an opposite, second side, and a polygon-shaped recess defined in the second side, the worm wheel attached onto the base through the fixing pin on the first side, and meshing with the worm shaft of the motor;
        a connector having a first end portion and a second end portion extending oppositely from the first end portion, the first end portion formed in a polygon shape substantially complemental to that of the polygon-shaped recess such that the first end portion is tightly received in the polygon-shaped recess; and
        a cushion member placed between walls of the polygon-shaped recess of the worm wheel and the first end portion of the connector.

2. The actuator of claim 1, wherein the housing has side walls and a bottom wall defining an opening therewith, and a cover adapted to cover the opening.

3. The actuator of claim 2, wherein the mounting means comprises two or more support posts formed on the cover of the housing to define a space therebetween, and two or more sleeve members attached to the respective support posts, such that, as assembled, the motor is tightly positioned in the space, wherein the two or more sleeve members are formed of an elastic material.

4. The actuator of claim 2, wherein the mounting means comprises two or more support posts formed on the bottom wall of the housing to define a space therebetween, and two or more sleeve members attached to the respective support posts, such that, as assembled, the motor is tightly positioned in the space, wherein the two or more sleeve members are formed of an elastic material.

5. The actuator of claim 2, wherein further comprising an elastic pad placed between the motor and the bottom wall of the housing.

6. The actuator of claim 2, further comprising a gasket member placed between the motor and the cover.

7. The actuator of claim 1, further comprising an adjustable member operatively connected to the second end portion of the connector of the transmission mechanism, such that when the motor rotates in one direction, the adjustable member is in an extending movement, and when the motor rotates in the other direction, the adjustable member is in a retracting movement.

8. An actuator for converting a rotating motion into a linear reciprocating motion, comprising:
    (a) a motor having a front end and an output worm shaft extending from the front end;
    (b) a transmission mechanism operatively coupled to the output worm shaft of the motor for converting a rotating motion of the motor into a linear reciprocating motion, wherein the transmission mechanism is devoid of a coil spring; and
    (c) a housing and mounting means for mounting the motor in the housing, wherein the mounting means is devoid of a foam plastic block,
    wherein the housing has side walls and a bottom wall defining an opening therewith, and a cover adapted to cover the opening; and
    wherein the mounting means comprises at least one Ω-shaped clamp and two or more screws to securely mount the motor on the bottom wall of the housing, such that, as assembled, the motor is tightly positioned between the Ω-shaped clamp and the bottom wall of the housing.

9. The actuator of claim 8, wherein the transmission mechanism comprises:
   a bracket mounted onto the front end of the motor, having a base, and a fixing pin extending from the base along a direction perpendicularly to the worm shaft of the motor;
   a worm wheel having a first side, an opposite, second side, a recess defined in the second side, and limiting structures spaced-apart formed on walls of the recess, the worm wheel attached onto the base through the fixing pin on the first side, and meshing with the worm shaft of the motor;
   a gasket having flanges radially protruded from a perimeter of the gasket, placed in the recess of the worm wheel such that each limiting structure is tightly positioned between two adjacent flanges; and
   a connector having a first end portion and a second end portion extending oppositely from the first end portion, the first end portion formed with engaging posts, placed in the recess of the worm wheel such that each engaging post is tightly positioned between two adjacent flanges and between two adjacent limiting structures, whereby each flange of the gasket is tightly positioned between a respective limiting structure and a respective engaging post.

10. The actuator of claim 8, wherein the mounting means further comprises one or more cushions placed between the Ω-shaped clamp and the motor, wherein the one or more cushions are formed of an elastic material.

* * * * *